US 8,229,003 B2

United States Patent
Gaddam et al.

(10) Patent No.: US 8,229,003 B2
(45) Date of Patent: Jul. 24, 2012

(54) PARAMETER ENCODING FOR AN IMPROVED ATSC DTV SYSTEM

(75) Inventors: Vasanth R. Gaddam, Ossining, NY (US); Dagnachew Birru, Yorktown Heights, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 1843 days.

(21) Appl. No.: 10/533,174

(22) PCT Filed: Sep. 5, 2003

(86) PCT No.: PCT/IB03/03815
§ 371 (c)(1), (2), (4) Date: Apr. 29, 2005

(87) PCT Pub. No.: WO2004/023817
PCT Pub. Date: Mar. 18, 2004

(65) Prior Publication Data
US 2006/0045191 A1    Mar. 2, 2006

Related U.S. Application Data

(60) Provisional application No. 60/408,956, filed on Sep. 6, 2002, provisional application No. 60/466,038, filed on Apr. 28, 2003, provisional application No. 60/462,776, filed on Apr. 14, 2003.

(51) Int. Cl.
*H04N 7/18* (2006.01)
(52) U.S. Cl. .............................. 375/240.26; 375/240.27
(58) Field of Classification Search ........ 375/240.01–240.29; 348/423.1–425.4
See application file for complete search history.

(56) References Cited

U.S. PATENT DOCUMENTS

| 5,396,196 | A | 3/1995 | Blodgett |
| 5,867,484 | A * | 2/1999 | Shaunfield ............... 370/395.51 |
| 6,404,818 | B1 | 6/2002 | Obikane |
| 6,421,397 | B1 | 7/2002 | McVey |
| 6,768,517 | B2 * | 7/2004 | Limberg et al. ............... 348/614 |
| 7,111,221 | B2 * | 9/2006 | Birru et al. .................... 714/755 |
| 2002/0181581 | A1 | 12/2002 | Birru et al. |
| 2002/0191712 | A1 | 12/2002 | Gaddam et al. |
| 2002/0194570 | A1 | 12/2002 | Birru et al. |

FOREIGN PATENT DOCUMENTS

| GB | 2213006 A | 8/1989 |
| JP | 11205696 A | 7/1999 |
| WO | 0147253 A1 | 6/2001 |
| WO | 0205555 A1 | 1/2002 |

OTHER PUBLICATIONS

McKinney et al., ATSC Digital Television Standard, 1995, pp. 1-74, XP-002208768.
Hopkins, "Digital Terrestrial HDTV for North America: The Grand Alliance HDTV System", EBU Review Technical, 1994, pp. 1-15, XP-000438385.

* cited by examiner

*Primary Examiner* — Andy Rao

(57) ABSTRACT

Transmission of a digital television signal conveys data parameters along with the encoder data that are utilized by the receiver in equalization and in decoding the encoded data. Leveraging the existing digital television standard data formatting, parameters are split between the two fields of a frame of the interlaced signal. Spread spectrum techniques are employed to robustly convey the parameters in encoded form to the receiver.

22 Claims, 2 Drawing Sheets

PARAMETER ENCODING FOR AN IMPROVED ATSC DTV SYSTEM

CROSS REFERENCE TO RELATED APPLICATION

The present invention claims the benefit of commonly-owned, U.S. Provisional Patent Application Ser. No. 60/408,956 filed Sep. 6, 2002, U.S. Provisional Patent Application Serial No. 60/466,038 filed Apr. 28, 2003 and is related to U.S. Patent Publication Nos. 2002/0194570, 2002/0191712, 2002/0181581, filed on Apr. 22, 2002, Apr. 9, 2002, Feb. 19, 2002, respectively, and to the commonly-assigned patent application entitled "PACKET INSERTION MECHANISM FOR AN IMPROVED ATSC DTV SYSTEM," U.S. Provisional Patent Application Ser. No. 60/462,776 filed on Apr. 14, 2003, the entire contents and disclosure of each of which are incorporated by reference as if fully set forth herein.

BACKGROUND OF THE INVENTION

Field of the Invention

The present invention relates to a digital signal transmission system and particularly to the transmission of a signal representative of encoded digital data.

DISCUSSION OF THE PRIOR ART

The ATSC standard for high-definition television (HDTV) transmission over terrestrial broadcast channels uses a signal that comprises a sequence of twelve (12) independent time-multiplexed trellis-coded data streams modulated as an eight (8) level vestigial sideband (VSB) symbol stream with a rate of 10.76 MHz. This signal is converted to a six (6) MHz frequency band that corresponds to a standard VHF or UHF terrestrial television channel, over which the signal is broadcast at a data rate of 19.39 million bits per second (Mbps). Details regarding the (ATSC) Digital Television Standard and the latest revision A/53 are available at http://www.atsc.org/.

While the existing ATSC 8-VSB A/53 digital television standard is sufficiently capable of transmitting signals that overcome numerous channel impairments such as ghosts, noise bursts, signal fades and interferences in a terrestrial setting, receiving antennas have increasingly been placed indoors, adding to the challenge of delivering a clear signal. There accordingly exists a need for flexibility in the ATSC standard so that streams of varying priority and data rates may be accommodated.

To address these concerns, the present inventors have disclosed enhancements to the A/53 transmitter in U.S. patent Publication Nos. 2002/0194570 (hereinafter "the '570 application"), 2002/0191712 (hereinafter "the 712" application"), 2002/0181581 (hereinafter "the 581 application") and "PACKET INSERTION MECHANISM FOR AN IMPROVED ATSC DTV SYSTEM" (hereinafter "the Packet Insertion application") whose disclosures have been incorporated by reference herein.

The present invention is directed to further improvements relating to signal transmission quality and to efficient leverage of existing A/53 infrastructure.

SUMMARY OF THE INVENTION

In one aspect, the present invention concerns the encoding of parameters to be embodied within a television broadcast signal for transmission.

In another aspect, the present invention relates to techniques for encoding into a signal parameters to be transmitted and which are needed by a wireless receiver both to correctly ascertain the transmitted signal and to decode data accompanying the parameters in the signal.

In yet another aspect, the present invention concerns leveraging data structures in a standard television protocol to accommodate enhancements to the standard that retain compatibility with existing receivers.

In accordance with preferred embodiments of the invention, there is provided wireless communication of a leading bit string comprising a header and a body, and a trailing bit string comprising a header and a body. For example, a bit string of length N may have a header $X_0, X_1, \ldots X_K$ and a body $X_{K+1}, X_{K+2}, \ldots X_{N-1}$. Data is encoded to form the body of the leading bit string. The header of the trailing bit string is formed to include at least one bit of a parameter to be used by a receiver in decoding the encoded data. A wireless signal representing at the receiver the leading bit string and then the trailing bit string is transmitted to the receiver.

The encoding techniques preferably include applying a fixed code to encode bits of a bit-stream, one-by-one, to create an encoded bit-stream. The encoded bit-stream is modulated to produce a signal whose frequency range at any given time is predetermined independently of the code. The signal, thus modulated, is transmitted within the frequency range.

BRIEF DESCRIPTION OF THE DRAWINGS

Details of the invention disclosed herein shall be described below, with the aid of the figures listed below.

DETAILED DESCRIPTION OF THE PREFERRED EMBODIMENTS

Figure 1:
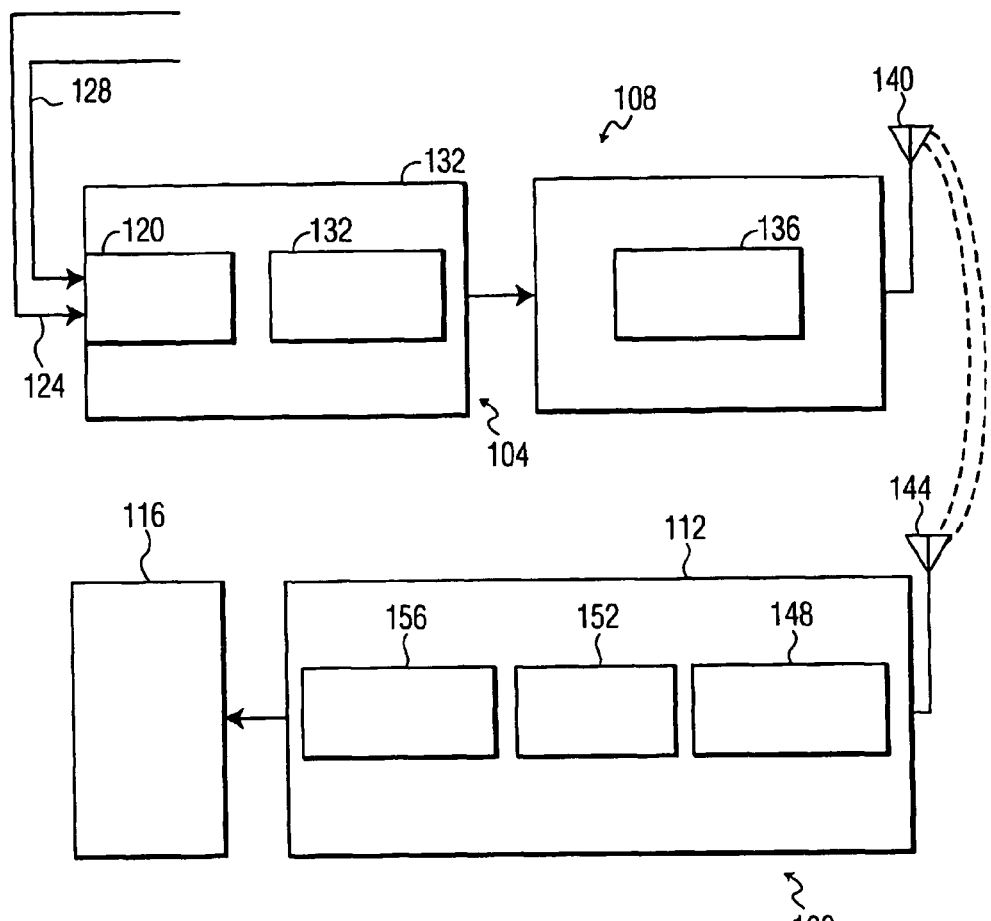
FIG. 1 illustrates a block diagram of an exemplary television communication system according with the present invention.

FIG. 1 depicts an exemplary embodiment of television communication system 100 in accordance with the invention. The communication system 100 includes an encoder 104, a transmitter 108, a receiver 112 and a data decoder 116. The encoder 104 includes a data encoder 120, which receives a parameter bit-stream 124 and a data bit-stream 128, and a parameter encoder 132. The transmitter 108 is communicatively connected to the encoder 104 and has a modulator 136 and an antenna 140. The receiver 100 an 112 has an antenna 144 configured for wireless reception of signaling from the antenna 140. The receiver 112 further includes a demodulator 148, a parameter decoder 152 and an equalizer 156, and is communicatively connected with the data decoder 116.

Figure 2:
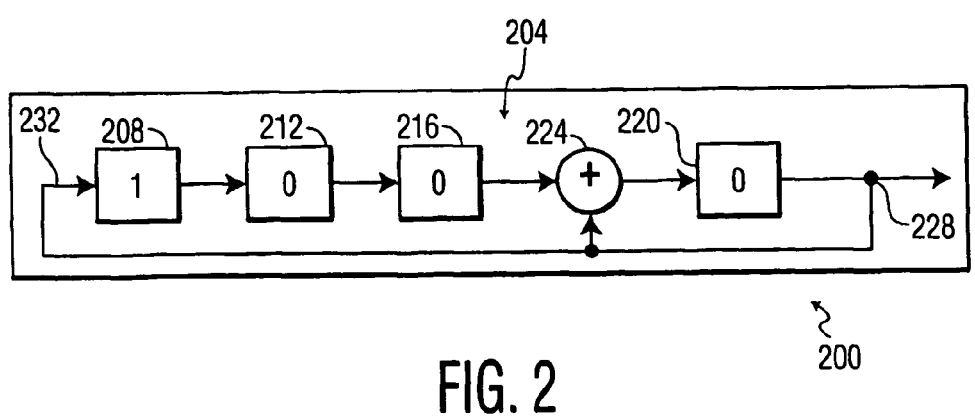
FIG. 2 is a diagram of a circuit used for encoding parameters in the system portrayed in FIG. 1.

FIG. 2 illustrates an example of a sequence generator 200 utilized for bit encoding in accordance with the present invention. The sequence generator 200 includes a four element shift register 204, which has four delay elements such as D flip-flops 208, 212, 216, 220. An exclusive-OR gate tap 224 is disposed between the third element 216 and the fourth element 220. The fourth element 220 has an output terminal 228 which feeds back to an input terminal 232 of the first element 208 and to the tap 224.

As shown in FIG. 2, each of the flip-flops 208-220 has a pre-loaded bit value and is connected to a common clock (not shown). With the first clock pulse, for example, the output "0" on the fourth flip-flop 220 feeds back to first flip-flop 208. On that same pulse, the value "1" of the first flip-flop 208 shifts forward to the second flip-flop 212. Likewise, the value "0" on the second flip-flop 212 shifts forward to the third flip-flop 216. Again, on that same pulse, the value "0" of the third flip-flop 216 is exclusively-ORed with the output "0" to shift the result, "0", to the fourth flip 220. Accordingly, after the first clock pulse, the register contents have changed from "1000" to "0100". Each subsequent clock pulse changes the register contents, and the sequence starts to repeat after 15 clock pulses. The pre-load followed by 14 clock pulses generates at the output 228 the sequence "000111101011001" which repeats for each subsequent 15 clock pulses. This sequence is a linear recursive sequence, i.e., a periodic sequence of bits generated by shift register with feedback. The above sequence is used in the present invention as a fixed code. In particular, the fixed code is applied to each bit of data to be encoded to produce the same 15-bit fixed code if the bit is zero, or the opposite of the code, i.e., with zeroes becoming ones and ones becoming zeroes, if the bit is one. This can be implemented by, for example, connecting the output 228 and the bit to be encoded to an XOR gate, and the resulting output and the bit value "1" to another XOR gate. Advantageously, the sequence "000111101011001" can be reliably detected at the receiver, because it minimally correlates with a shifted version of itself. In an alternative implementation, the sequence generator 200 can include an additional XOR gate tap between the first element 208 and the second element 212 that is fed by the output 228. Also, pre-load values other than "1000" can be used. Nor is a sequence generator in accordance with the invention limited to four delay elements. It is further within the intended scope of the invention for the sequence generator 200 to be implemented with an XOR gate or gates in the feedback path rather than embedded within register 204.

Figure 3:
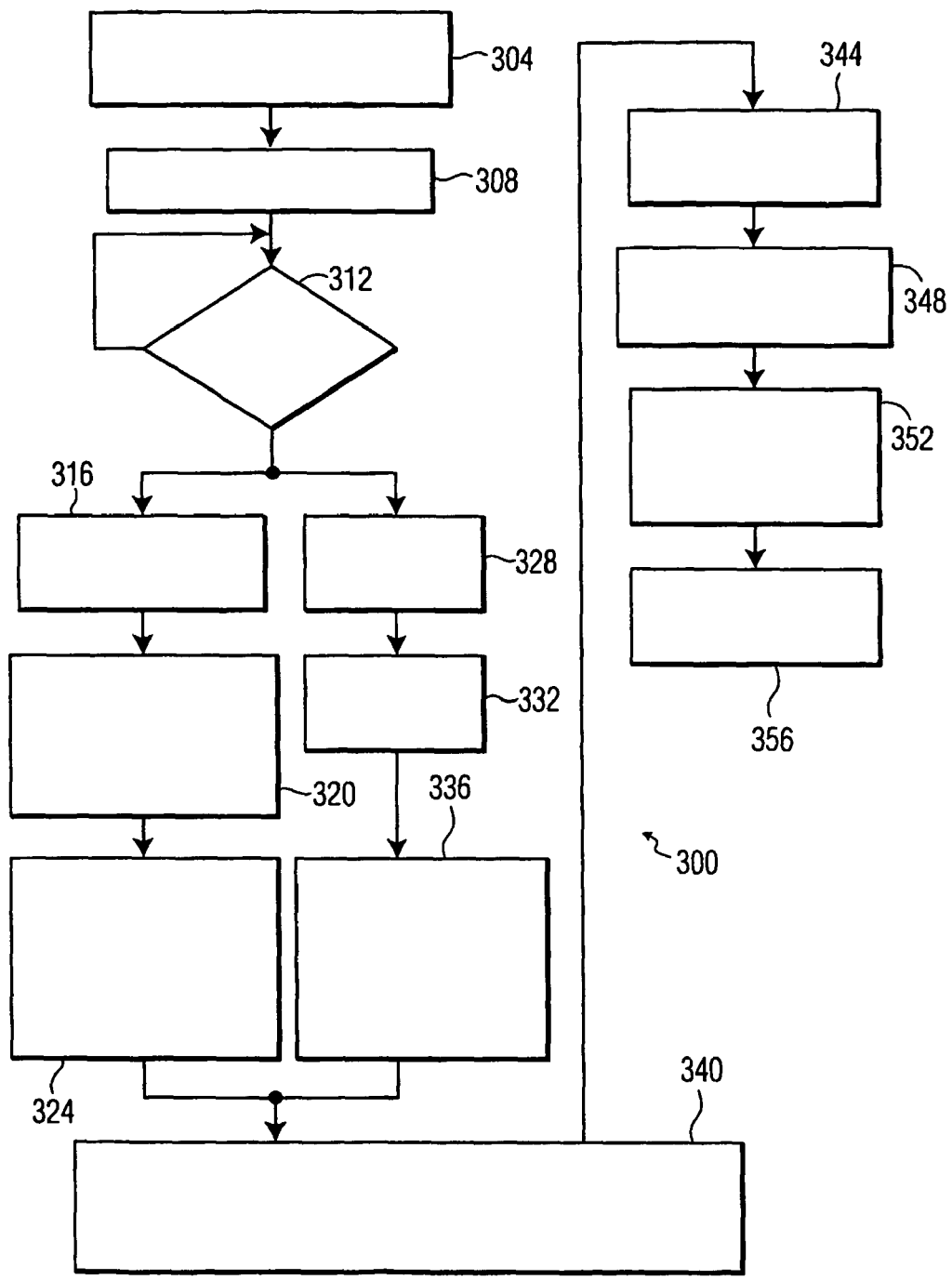
FIG. 3 is an exemplary flow diagram representative of processing that data for transmission undergoes in the system of FIG. 1 prior to transmission and after reception.

FIG. 3 is an exemplary flow diagram which shows one example of the processing of the parameter and data bit-streams 124, 128 in the digital television communication system 100. A frequency range of the signal for transmission is determined (304) and may, alternatively, be determined at any point before modulation of the signal for transmission. The frequency range of the signal may also be changed or varied, for example in accordance with the type of data being processed, although it is predetermined independently of the fixed code. In step 308, a fixed code is determined, although it can be determined any time before encoding.

If there is no data for transmission (312), processing waits.

Otherwise, if the parameter bit-stream 124 is ready for reception by the data encoder 120, it is received (316). The parameter bit-stream 124 is time-synchronized with the data bit-stream 128, and may therefore not be ready for reception if the data bit-stream is not ready. In addition, no parameters may be ready for reception if parameters have not changed, since parameters for the system 100 do not necessarily change in any particular time period. If the parameter bit-stream 124 is received, its bits are encoded bit-by-bit, one bit at a time, by the parameter encoder 132 using the fixed code (320). A predetermined number of encoded bits are used in forming the headers of two bit strings before a new bit string pair is utilized, each bit string consisting of two parts, a header and a body. One of the two bit strings is a leading bit string and the other one is a trailing bit string. Specific ones of the encoded parameters are allotted the leading bit string header and the other parameters are allotted to the trailing bit string header (324).

Meanwhile, if the data bit-stream 128 is ready for input, it is received (328) and encoded (332). Although the parameter bit-stream 124 is preferably encoded bit-by-bit, one bit at a time, encoding of the data bit-stream would not typically be subject to such restrictions. The data bit-stream 128 is a video interlaced signal, and, as such, represents a frame which divides into two fields, an even field and an odd field. Encoded data from one of the fields is used in forming the body of a leading bit string. Similarly, encoded data from the other field is used in filling the body of a trailing bit string (336). Processing of the data and parameter bit-streams 124, 128 is synchronized so that each of the two types of bit strings receives its respective encoded data and encoded parameters that correspond to that data. In one embodiment, although the encoded parameters for a frame are divided into two groups for forming their respective field headers, the encoded parameters apply to the encoded data of the entire frame.

A carrier signal is then modulated by the modulator 136 using the encoded bit string pair for wireless transmission of a signal representing at the receiver the leading bit string and then the trailing bit string (340).

The received signal is demodulated by the demodulator 148 (344), and parameters are decoded by the parameter decoder 152 (348).

The parameters define the number of discrete levels in the digital wireless signal conveying the bit-streams 124, 128, and are therefore used by the equalizer 156 in resolving multipath or otherwise converging the signal (352). The decoded parameters are also utilized in decoding the data bit-stream 128 (356).

The inventive television communication system 100 can be implemented to enhance an A/53 system proposed by the current inventors and described in the Packet Insertion application.

The Packet Insertion application discusses the use of the following parameters in a parameter bit-stream.

TABLE 1

Parameter Definitions

| Parameter Name | Definition | Number of bits |
|---|---|---|
| MODE | Modulation type (2-VSB, E-VSB etc) | 2 |
| NRS | Presence of Backward Compatible Parity Byte Generator (BCPBG) | 1 |
| NRP | Number of robust packets before encoding | 4 |
| TR | Coding Rate | 1 |

The parameters convey the number of levels in the transmitted signal, and since this information is used by the equalizer, the parameters must be decoded before equalization. Therefore, robust methods that can survive severe channel conditions are needed. The present invention expands on the '570 techniques of transmitting these parameters to the receiver in a reliable manner.

In accordance with the A/53 standard, the header of each field contains an 832-bit "data field sync" of specific format. The format includes a 92-bit reserved area (corresponding to symbol numbers 729-820) which the standard recommends be filled with repeated information for extra redundancy.

As shown above in TABLE 1, 8 parameter bits need to be transmitted. Encoding by the sequence generator of FIG. 2 yields 8×15=120 bits, a total which exceeds the 92 bits of reserved space. The inventive technique splits the encoded bits between the two fields of a frame, e.g. 4 bits allocated per field. An extra parity bit is added to each group of 4 bits for an additional level of error detection, bringing the total to 5 bits, or 5×15=75 encoded bits, per field. TABLE 2 below defines the symbols 729-820 for odd and even fields.

TABLE 2

Symbol definitions in Field sync

| Symbol Number | Even (odd) field sync | Odd (even) field sync |
|---|---|---|
| 729-743 | LSB of MODE | bit0 (LSB) of NRP |
| 744-758 | MSB of MODE | bit1 of NRP |
| 759-773 | NRS | bit2 of NRP |
| 774-788 | TR | bit3 (MSB) of NRP |
| 789-803 | Parity bit | Parity bit |
| 804-820 | Reserved | Reserved |

As set forth more fully in the Packet Insertion application, if MODE=0, the rest of the parameters are not utilized. Receivers adapted for the enhancements by the current inventors can decode the MODE parameter to identify whether the received signal embodies the enhanced bit-stream formats, and, if so, can decode the other parameters.

While there have been shown and described what are considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention claimed is:

1. An apparatus for wirelessly communicating a leading bit string comprising a header and a body, and a trailing bit string comprising a header and a body, the apparatus comprising:
   an encoder configured for encoding a data bit stream and a parameter bit stream to form the body of the leading bit string, and forming the header of the trailing bit string to include at least one bit of a parameter to be used by a receiver in decoding the data bit stream and the parameter bit stream, the encoding is achieved by applying a fixed code; and
   a transmitter configured for transmitting to the receiver a wireless signal representing at the receiver the leading bit string and then the trailing bit string, the encoded bit-stream is modulated to produce a signal whose frequency range at any given time is predetermined independently of the fixed code;
   wherein the encoder includes a data encoder for encoding the data bit stream and a parameter encoder for encoding the parameter bit stream, a portion of the parameter bit stream being used during encoding in cooperation with a parity bit.

2. The apparatus of claim 1, wherein the receiver comprises a digital television receiver.

3. The apparatus of claim 1, wherein said encoder is further configured for creating said bit strings so that a parameter in at least one of the leading and trailing bit string headers is utilizable by an equalizer in said receiver to resolve a signal that embodies at least one of the leading and trailing bit strings.

4. The apparatus of claim 1, wherein said parameter is one of a plurality of parameters having bits, the plural bits being divided into two bit groups each having an equal number of bits, one of said groups being utilized in forming the leading bit string header, the other group being utilized in forming the trailing bit string header, each of said groups further including the parity bit generated based on the bits of equal number of the group.

5. An apparatus for wirelessly transmitting a data bit stream and a parameter bit stream, the apparatus comprising:
   an encoder configured for applying a fixed code to encode bits of the data bit stream and the parameter bit stream, one-by-one, to create an encoded bit-stream; and
   a transmitter configured for modulating the encoded bit-stream to produce a signal whose frequency range at any given time is predetermined independently of the fixed code, and for wirelessly transmitting said signal within the frequency range;
   wherein the encoder includes a data encoder for encoding the data bit stream and a parameter encoder for encoding the parameter bit stream, a portion of the parameter bit stream being used during encoding in cooperation with a parity bit.

6. The apparatus of claim 5, wherein the fixed code comprises a linear recursive sequence.

7. The apparatus of claim 6, wherein the fixed code is "000111101011001".

8. The apparatus of claim 6, wherein the encoder further comprises a sequence generator that includes:
   a four-element shift register, the first element having an input terminal and the fourth element having an output terminal; and
   an exclusive-OR (XOR) gate tap disposed between the third and fourth elements, wherein said output terminal is connected to feed back to the first element and to the XOR gate tap.

9. The apparatus of claim 5, wherein said encoder is configured for combining the parameter and data bit-streams, after the parameter and data bitstreams have been encoded, to create said encoded bit-stream that is modulated to produce said signal whose frequency range at any given time is predetermined independently of the fixed code, the parameter being defined so as to be utilizable by an equalizer configured to receive and to resolve said signal, the equalizer being part of a receiver configured for decoding the encoded data bit-stream from said body.

10. The apparatus of claim 5, wherein:
    said encoder is further configured for encoding data to form the body of a leading bit string comprising a header and a body, and for forming the header of a trailing bit string comprising a header and a body so that the trailing bit string header includes at least one bit that represents a parameter defined by said bits and to be used by a receiver in decoding the data encoded to form the leading bit string body, the encoder being further configured for combining the encoded data and said at least one bit in forming said encoded bit-stream to be modulated; and
    said transmitter is further configured for transmitting to the receiver by means of said signal the leading bit string and then the trailing bit string.

11. The apparatus of claim 10, wherein the bit-by-bit encoding of said bits is performed one bit at a time, the data to be encoded in forming said body of the leading bit string not being encoded one bit at a time using a fixed code.

12. A method for wirelessly communicating via a processor a leading bit string comprising a header and a body, and a trailing data string comprising a header and a body, the method comprising the steps of:
    encoding a data bit stream and a parameter bit stream via an encoder applying a fixed code;
    forming the body of the leading bit string from the encoded bit streams;

forming the header of the trailing bit string to include at least one bit of a parameter to be used by a receiver in decoding the encoded bit streams;

modulating the encoded bit-stream to produce a signal whose frequency range at any given time is predetermined independently of the fixed code; and transmitting to the receiver a wireless signal representing at the receiver the leading bit string and then the trailing bit string;

wherein the encoder includes a data encoder for encoding the data bit stream and a parameter encoder for encoding the parameter bit stream, a portion of the parameter bit stream being used during encoding in cooperation with a parity bit.

13. The method of claim 12, wherein the receiver comprises a digital television receiver.

14. The method of claim 12, further comprising the step of utilizing, by an equalizer in said receiver, a parameter in at least one of the leading and trailing bit string headers to resolve a signal that embodies at least one of the leading and trailing bit strings.

15. The method of claim 12, wherein said parameter is one of a plurality of parameters having bits, the forming step further comprising the steps of:

dividing the plural bits into two bit groups each having an equal number of bits;

generating parity bits for each group, both the parity bits being generated based on the bits of equal number of the group;

utilizing one of said groups in forming the leading bit string header; and utilizing the other group in forming the trailing bit string header.

16. A method for wirelessly transmitting via a processor a bitstream, the method comprising the steps of:

determining a fixed code;

applying the fixed code to encode bits of a data bit stream and a parameter bit stream via an encoder, one-by-one, to create an encoded bit-stream;

modulating the encoded bit-stream to produce a signal whose frequency range at any given time is predetermined independently of the fixed code; and wirelessly transmitting said signal within the frequency range;

wherein the encoder includes a data encoder for encoding the data bit stream and a parameter encoder for encoding the parameter bit stream, a portion of the parameter bit stream being used during encoding in cooperation with a parity bit.

17. The method of claim 16, wherein the fixed code comprises a linear recursive sequence.

18. The method of claim 17, wherein the fixed code is "000111101011001".

19. The method of claim 17, further comprising the steps of:

providing a four-element shift register, the first element having an input terminal and the fourth element having an output terminal;

disposing an exclusive-OR (XOR) gate tap between the third and fourth elements; and connecting said output terminal to feed back to the first element and to the XOR gate tap.

20. The method of claim 16, further comprising the steps of:

combining the parameter bit-stream with the data bit-stream, after the parameter and data bit-streams have been encoded, to create said encoded bit-stream that is modulated to produce said signal whose frequency range at any given time is predetermined independently of the fixed code;

configuring a bit string to comprise a header and a body, the header containing the encoded parameter and the body containing the encoded data bit-stream; and performing the forming, combining and configuring steps so that the parameter is utilizable by an equalizer that is to receive and to resolve said signal and that is part of a receiver for decoding the encoded data bit-stream.

21. The method of claim 16, further comprising the steps of:

encoding data to form the body of a leading bit stream comprising a header and body;

forming the header of a trailing bit stream, comprising a header and a body, to include at least one bit that represents a parameter defined by said bits and to be used by a receiver in decoding the data encoded to form the leading bit string body;

combining the encoded and said at least one bit in forming said encoded bit-stream to be modulated; and transmitting to the receiver by means of said signal the leading bit string and then the trailing bit string.

22. The method of claim 21, wherein the bit-by-bit encoding of said bits is performed one bit at a time, the data to be encoded in forming said body of the leading bit stream not being encoded one bit at a time using a fixed code.

* * * * *